US009624359B2

(12) United States Patent
Abad et al.

(10) Patent No.: US 9,624,359 B2
(45) Date of Patent: *Apr. 18, 2017

(54) FUNCTIONAL DIENE ELASTOMER WITH A LOW PI AND IMPROVED COLD FLOW, AND RUBBER COMPOSITION CONTAINING SAME

(75) Inventors: Mathilde Abad, Clermont-ferrand (FR); Margarita Dorato, Clermont-ferrand (FR); Jean-Michel Favrot, Clermont-ferrand (FR); Nathalie Simon, Clermont-ferrand (FR); Jean Marc Marechal, Clermont-ferrand (FR); Stéphanie De Landtsheer, Clermont-ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 907 days.

This patent is subject to a terminal disclaimer.

(21) Appl. No.: 13/989,103

(22) PCT Filed: Nov. 23, 2011

(86) PCT No.: PCT/EP2011/070742
§ 371 (c)(1),
(2), (4) Date: Jul. 16, 2013

(87) PCT Pub. No.: WO2012/069506
PCT Pub. Date: May 31, 2012

(65) Prior Publication Data
US 2013/0289163 A1 Oct. 31, 2013

(30) Foreign Application Priority Data
Nov. 23, 2010 (FR) ...................................... 10 59641

(51) Int. Cl.
| C08L 9/00 | (2006.01) |
| C08C 19/26 | (2006.01) |
| C08C 19/44 | (2006.01) |
| C08L 15/00 | (2006.01) |
| C08L 9/06 | (2006.01) |

(52) U.S. Cl.
CPC ................ *C08L 9/00* (2013.01); *C08C 19/26* (2013.01); *C08C 19/44* (2013.01); *C08L 9/06* (2013.01); *C08L 15/00* (2013.01)

(58) Field of Classification Search
CPC ....................................................... C08L 9/00
USPC ....................................................... 523/156
See application file for complete search history.

(56) References Cited

U.S. PATENT DOCUMENTS

| 4,550,142 A | 10/1985 | Akita et al. |
| 5,066,721 A | 11/1991 | Hamada et al. |
| 5,248,722 A | 9/1993 | DeTrano et al. |
| 5,512,626 A | 4/1996 | Matsuo et al. |
| 5,916,957 A | 6/1999 | Itoh et al. |
| 6,013,718 A | 1/2000 | Cabioch et al. |
| 6,191,234 B1 | 2/2001 | Tadaki et al. |
| 6,225,397 B1* | 5/2001 | Materne ................... C08K 3/36 152/209.1 |
| 6,774,255 B1 | 8/2004 | Tardivat et al. |
| 7,629,409 B2* | 12/2009 | Kanz ......................... B60C 1/00 152/450 |
| 2003/0212185 A1 | 11/2003 | Vasseur |
| 2004/0051210 A1 | 3/2004 | Tardivat et al. |
| 2004/0167705 A1 | 8/2004 | Lingman et al. |
| 2005/0016650 A1 | 1/2005 | Durel et al. |
| 2005/0016651 A1 | 1/2005 | Durel et al. |
| 2005/0209393 A1 | 9/2005 | Hochi |
| 2007/0112120 A1 | 5/2007 | Vasseur |
| 2007/0179247 A1* | 8/2007 | Sandstrom ............ B60C 1/0016 525/191 |
| 2008/0132644 A1 | 6/2008 | Lapra et al. |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2009/0270558 A1 | 10/2009 | Gandon-Pain et al. |
| 2011/0009547 A1 | 1/2011 | Araujo Da Silva et al. |
| 2011/0152458 A1 | 6/2011 | Araujo Da Silva et al. |

FOREIGN PATENT DOCUMENTS

| EP | 0647675 A1 | 4/1995 |
| EP | 0 709 235 A1 | 5/1996 |

(Continued)

OTHER PUBLICATIONS

International Search Report (PCT/ISA/210) issued on Jan. 25, 2012, by the European Patent Office as the International Searching Authority for International Application No. PCT/EP2011/070742.
Written Opinion (PCT/ISA/237) issued on Jan. 25, 2012, by the European Patent Office as the International Searching Authority for International Application No. PCT/EP2011/070742.
French Search Report for FR 1059641 dated Apr. 12, 2011.

*Primary Examiner* — Doris Lee
(74) *Attorney, Agent, or Firm* — Dickinson Wright PLLC

(57) ABSTRACT

The invention relates to a functionalized diene elastomer composed:
a) of a diene elastomer functionalized, at the chain end or in the middle of the chain, by a tin functional group, exhibiting a monomodal distribution of molecular weights before functionalization and a polydispersity index before functionalization of less than or equal to 1.3,
b) of a diene elastomer star-branched with a tin compound, exhibiting a monomodal distribution of molecular weights before star-branching and a polydispersity index before star-branching of less than or equal to 1.3, and
c) of a content of less than 15% by weight, with respect to the total weight of the functionalized diene elastomer, of a non-tin-functional diene elastomer,
the said diene elastomers a), b) and c) being, before optional functionalization or optional star-branching, the same in nature.

18 Claims, No Drawings

(56) References Cited

FOREIGN PATENT DOCUMENTS

| EP | 0924227 A1 | 6/1999 |
|---|---|---|
| EP | 1577339 A1 | 9/2005 |
| FR | 2 526 030 A1 | 11/1983 |
| FR | 2 740 778 A1 | 5/1997 |
| WO | WO 97/36724 A2 | 10/1997 |
| WO | WO 99/16600 A1 | 4/1999 |
| WO | WO 02/10269 A2 | 2/2002 |
| WO | WO 02/30939 A1 | 4/2002 |
| WO | WO 02/31041 A1 | 4/2002 |
| WO | WO 03/002648 A1 | 1/2003 |
| WO | WO 03/002649 A1 | 1/2003 |
| WO | WO 03/016837 A1 | 2/2003 |
| WO | WO 2006/069792 A1 | 7/2006 |
| WO | WO 2006/069793 A1 | 7/2006 |
| WO | WO 2006/125532 A1 | 11/2006 |
| WO | WO 2006/125533 A1 | 11/2006 |
| WO | WO 2006/125534 A1 | 11/2006 |
| WO | WO 2009/062733 A2 | 5/2009 |

* cited by examiner

FUNCTIONAL DIENE ELASTOMER WITH A LOW PI AND IMPROVED COLD FLOW, AND RUBBER COMPOSITION CONTAINING SAME

BACKGROUND

1. Field

The present invention relates to a functionalized diene elastomer composed of a specific functionalized diene elastomer and of a specific star-branched diene elastomer.

2. Description of Related Art

The reduction in the hysteresis of the mixtures is an ongoing objective of the tire industry in order to limit the consumption of petrol and to thus protect the environment. This reduction in hysteresis must, however, be carried out while keeping intact, indeed even while improving, the processability of the mixtures.

Many solutions have already been experimented with in order to achieve the objective of fall in hysteresis. In particular, the functionalization of the polymers by a functional group which interacts with the reinforcing filler has appeared as an advantageous route.

Functional groups which interact with the filler have thus been attached at the chain end at the start or end of polymerization by means of functional initiators or functionalization agents. By way of example, 4,4'-bis(diethylamino)benzophenone, also known as DEAB, or other aminated functional groups which interact with carbon black have been added at the end of polymerization, as described in the patent documents FR 2 526 030 and U.S. Pat. No. 4,848,511. The polymers coupled by or star-branched by tin comprise functional groups capable of interacting with carbon black which are introduced at the end of polymerization. Mention may be made, by way of example, of the European patent document EP 0 709 235. Functional groups which interact with silica have also been attached at the chain end at the end of polymerization, such as functional groups comprising a silanol group which are disclosed in the patent document FR 2 740 778 or functional groups comprising alkoxysilane or aryloxysilane groups which are described in the document U.S. Pat. No. 5,066,721. The majority of these solutions, both for the black and for the silica, genuinely result in a limitation on hysteresis of the corresponding compositions but concomitantly in a greater difficulty in processing these same compositions.

It is also known that polymers having narrow molecular distributions confer a reduced hysteresis on the rubber compositions in which they are present. In particular, linear functional diene elastomers with narrow molecular distributions before functionalization exhibit improved hysteresis properties. However, these elastomers exhibit an increased cold flow in comparison with the same elastomers exhibiting a broad molecular distribution before functionalization, which is damaging for the storage and transportation of the elastomers.

Many solutions exist in order to reduce the cold flow. The work Nouvelles Recherches dans le Domaine des Composes Macromoléculaires [New Research in the Field of Macromolecular Compounds], editor(s) Ceausescu E, Oxford, Pergamon Press Ltd., 1984, pp. 343-56, 72, mentions methods for reducing cold flow, such as the increase in the molecular weight, the star-branching or the degree of branching. However, the increase in the molecular weight is highly damaging to the use of the mixtures while the branching is accompanied by an increase in the hysteresis of the mixtures. Furthermore, surprisingly, the polymers solely star-branched by tin (3 or 4 branches) exhibit greater hysteresis in comparison with the polymers coupled by tin.

It is also known that, in order to solve the problem of cold flow, the polydispersity index of the elastomer can be increased. However, this is not without effect on the properties of the rubber compositions in which it is present, in particular on the hysteresis or the processability of the mixtures, for example.

Patent EP 0 924 227 describes a copolymer of a conjugated diolefin and of a vinylaromatic compound comprising an amine functional group in the polymer chain and exhibiting a polymodal molecular distribution. This patent describes two processes for producing the said polymer having a specific molecular distribution which generate an amount of non-functional chains.

SUMMARY

There thus exists a need to provide an elastomer which confers, on a reinforced rubber composition, good properties of hysteresis and of processing for the purpose of a tire application, while exhibiting a reduced cold flow from the perspective of better behaviour during storage and transportation of the rubber.

The Applicant Company has discovered, surprisingly, that a functionalized diene elastomer composed of a diene elastomer functionalized at the chain end or in the middle of the chain by a tin functional group, exhibiting a narrow molecular weight distribution before functionalization, and of a diene elastomer star-branched with a tin-comprising compound, exhibiting a narrow molecular weight distribution before star-branching and comprising less than 15% by weight, with respect to the total weight of the functionalized diene elastomer, of non-tin-functional diene elastomer, confers, on a rubber composition in which it is present, rubber properties, in particular the hysteresis and processing properties, which are entirely acceptable for use in tires, while exhibiting a significantly improved resistance to cold flow.

A subject-matter of the invention is thus a functionalized diene elastomer composed:

a) of a diene elastomer functionalized, at the chain end or in the middle of the chain, by a tin functional group, exhibiting a monomodal distribution of molecular weights before functionalization and a polydispersity index before functionalization or coupling of less than or equal to 1.3, b) of a diene elastomer star-branched with a tin-comprising compound, exhibiting a monomodal distribution of molecular weights before star-branching and a polydispersity index before star-branching of less than or equal to 1.3, and c) of a content of less than 15% by weight, with respect to the total weight of the functionalized diene elastomer, of a non-tin-functional diene elastomer.

DETAILED DESCRIPTION OF SPECIFIC EMBODIMENTS

According to the invention, the diene elastomers a), b) and c) are, before optional functionalization or optional star-branching, the same in nature.

Preferably, the functionalized diene elastomer according to the invention comprises from 5% to 45% by weight, preferably from 10% to 30% by weight, with respect to the total weight of the functionalized diene elastomer, of the said star-branched diene elastomer b).

Preferably, the functionalized diene elastomer according to the invention comprises a content strictly of greater than 0% by weight and of less than 10% by weight and more preferably a content of less than 5% by weight, with respect to the total weight of the functionalized diene elastomer, of the said non-tin-functional elastomer c).

In the present description, the term "functionalized diene elastomer" is understood to mean a diene elastomer which comprises a group comprising one or more heteroatoms.

This group can be located at the chain end. It will then be said that the diene elastomer is functionalized at the chain end. It is generally an elastomer obtained by reaction of a living elastomer with a functionalization agent, that is to say any at least monofunctional molecule, the functional group being any type of chemical group known by a person skilled in the art to react with a living chain end.

This group can be located in the linear main elastomer chain. It will then be said that the diene elastomer is coupled or alternatively functionalized in the middle of the chain, in contrast to the position "at the chain end", although the group is not located precisely at the middle of the said elastomer chain. It is generally an elastomer obtained by reaction of a living elastomer with a coupling agent, that is to say any at least difunctional molecule, the functional group being any type of chemical group known by a person skilled in the art to react with a living chain end.

This group can be central, to which n elastomer chains or branches (n>2) are bonded, forming a star-branched structure of the elastomer. It will then be said that the diene elastomer is star-branched. It is generally an elastomer obtained by reaction of a living elastomer with a star-branching agent, that is to say any polyfunctional molecule, the functional group being any type of chemical group known by a person skilled in the art to react with a living chain end.

As explained above, the diene elastomer a) is functionalized at the chain end or in the middle of the chain by a tin functional group. The functionalization can be obtained with a monohalotin functionalization agent or a dihalotin coupling agent which can correspond to the general formula $R_{4-x}SnX^0{}_x$, where x represents an integer having the value 1 or 2, R represents an alkyl, cycloalkyl, aryl, alkaryl or vinyl radical having from 1 to 12 carbon atoms, preferably a butyl, and $X^0$ is a halogen atom, preferably chlorine. Mention may be made, as preferred functionalization agent, of tributyltin monochloride or dibutyltin dichloride. In the same way, the functionalization can be obtained with a tin-derived functionalization agent which can correspond to the general formula $(X^1{}_yR^1{}_{3-y}Sn)-O-(SnR^1{}_{3-z}X^1{}_z)$ or $(X^1{}_yR^1{}_{3-y}Sn)-O-(CH_2)_e-O-(SnR^1{}_3X^1{}_z)$, where y and z represent integers between 0 and 2 and y+z is equal to 1 or 2, $R^1$ represents an alkyl, cycloalkyl, aryl, alkaryl or vinyl radical having from 1 to 12 carbon atoms, preferably a butyl, $X^1$ is a halogen atom, preferably chlorine, and e represents an integer from 1 to 20, preferably 4.

According to the invention, the diene elastomer b) is star-branched by a tin functional group. The star-branching can be obtained with a tri- or tetrahalotin star-branching agent which can correspond to the general formula $R^2{}_qSnX^2{}_{4-q}$, where q represents an integer having the value 0 or 1, $R^2$ represents an alkyl, cycloalkyl, aryl, alkaryl or vinyl radical having from 1 to 12 carbon atoms, preferably a butyl, and $X^2$ is a halogen atom, preferably chlorine. Mention may be made, as preferred star-branching agent, of butyltin trichloride or tin tetrachloride. In the same way, the star-branching can be obtained with a tin-derived functionalization agent which can correspond to the general formula $(X^3{}_kR^3{}_{3-k}Sn)-O-(SnR^3{}_{3-1}X^3{}_1)$ or $(X^3{}_kR^3{}_{3-k}Sn)-O-(CH_2)_f-O-(SnR^3{}_{3-1}X^3{}_1)$, where k and 1 represent integers between 0 and 3, k+1 between 3 and 6, $R^3$ represents an alkyl, cycloalkyl, aryl, alkaryl or vinyl radical having from 1 to 12 carbon atoms, preferably a butyl, $X^3$ is a halogen atom, preferably chlorine, and f represents an integer having a value from 1 to 20, preferably 4.

According to a preferred embodiment, the diene elastomer a) is a diene elastomer functionalized by a tin functional group in the middle of the chain.

According to another preferred embodiment, the diene elastomer b) is a copolymer star-branched by tin having 4 branches.

According to another preferred embodiment, the diene elastomer a) is a diene elastomer functionalized by a tin functional group in the middle of the chain and the diene elastomer b) is a diene elastomer star-branched by tin having 4 branches.

According to the invention, the diene elastomer c) is a non-tin-functional diene elastomer. The said elastomer can be obtained during the functionalization.

According to the invention, the diene elastomer a) functionalized at the chain end or in the middle of the chain by a tin functional group exhibits a monomodal distribution of molecular weights before functionalization and a polydispersity index before functionalization of less than or equal to 1.3.

Likewise, according to the invention, the star-branched diene elastomer b) exhibits a monomodal distribution of molecular weights before star-branching and a polydispersity index before star-branching of less than or equal to 1.3.

Polydispersity index is understood to mean, within the meaning of the invention, the weight-average molecular weight/number-average molecular weight ratio.

Diene elastomer is understood to mean, according to the invention, any homopolymer obtained by polymerization of a conjugated diene monomer having from 4 to 12 carbon atoms, or any block, random, sequential or microsequential copolymer obtained by copolymerization of one or more conjugated dienes with one another or with one or more vinylaromatic compounds having from 8 to 20 carbon atoms. In the case of copolymers, the latter comprise from 20% to 99% by weight of diene units and from 1% to 80% by weight of vinylaromatic units.

The following are suitable in particular as conjugated dienes: 1,3-butadiene, 2-methyl-1,3-butadiene, 2,3-di($C_1$-$C_5$ alkyl)-1,3-butadienes, such as 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chloro styrenes, vinylmesitylene, divinylbenzene or vinylnaphthalene.

Preferably, the diene elastomer is chosen from polybutadienes, butadiene-styrene copolymers, butadiene-styrene-isoprene copolymers, styrene-isoprene copolymers, butadiene-isoprene copolymers and synthetic polyisoprene. Advantageously, the diene elastomer is a butadiene-styrene copolymer.

The following are particularly suitable: polybutadienes, in particular those having a content (mol %) of 1,2-units of between 4% and 80%, polyisoprenes, butadiene/styrene copolymers and in particular those having a Tg (glass transition temperature, measured according to ASTM D3418) of between 0° C. and −80° C. and more particularly between −10° C. and −70° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between 0° C. and −55° C.

In the case of butadiene/styrene/isoprene copolymers, those having a styrene content between 5% and 50% by weight and more particularly, of between 10% and 40%, an isoprene content of between 15% and 60% by weight and more particularly between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between 0° C. and −70° C., are suitable in particular.

The diene elastomer a) can comprise an amine functional group at one or all of the ends of chains not functionalized by tin. Likewise, the diene elastomer b) can comprise an amine functional group at the ends of chains not star-branched by tin. Likewise, the non-tin-functional diene elastomer c) can comprise an amine functional group at one of the chain ends.

The polymerization of diene monomers is initiated by an initiator. Use may be made, as polymerization initiator, of any known monofunctional anionic initiator. However, an initiator comprising an alkali metal, such as lithium, is preferably used.

Use may be made, as polymerization initiator, of any known monofunctional anionic initiator. However, an initiator comprising an alkali metal, such as lithium is preferably used. Those comprising a carbon-lithium or nitrogen-lithium bond are suitable in particular as organolithium initiators. Representative compounds are aliphatic organolithium compounds, such as ethyllithium, n-butyllithium (n-BuLi), isobutyllithium, and the like; lithium amides obtained from a secondary amine and more particularly those obtained from a cyclic secondary amine, such as pyrrolidine or hexamethyleneimine, which are soluble in a hydrocarbon solvent without use of a solvating agent, are highly preferred.

The polymerization is, as known per se, preferably carried out in the presence of an inert solvent which can, for example, be an aliphatic or alicyclic hydrocarbon, such as pentane, hexane, heptane, isooctane or cyclohexane, or an aromatic hydrocarbon, such as benzene, toluene or xylene.

The polymerization can be carried out continuously or batchwise. The polymerization is generally carried out at a temperature of between 20° C. and 120° C. and preferably in the vicinity of 30° C. to 90° C. It is, of course, also possible to add, at the end of polymerization, a transmetallation agent for modifying the reactivity of the living chain end.

The living diene elastomer resulting from the polymerization is subsequently functionalized in order to prepare the diene elastomer.

According to a first alternative form of the preparation of the functionalized diene elastomer according to the invention, the diene elastomer a) functionalized at the chain end or in the middle of the chain by a tin functional group and the star-branched diene elastomer b) are mixed in the appropriate proportions.

The diene elastomer a) functionalized at the chain end or in the middle of the chain by a tin functional group can be obtained, in a way known per se, by reaction of a tin derivative with the living diene elastomer resulting from the polymerization.

The star-branched elastomer b) can be obtained, in a way known per se, by reaction of a tin-comprising star-branching agent with the living diene elastomer resulting from the polymerization.

The mixing of the two elastomers can be carried out in an inert solvent, for example an aliphatic or alicyclic hydrocarbon, such as pentane, hexane, heptane, isooctane or cyclohexane, or an aromatic hydrocarbon, such as benzene, toluene or xylene, which can be the same as the polymerization solvent. The mixing is then carried out at a temperature preferably of between 20° C. and 120° C., preferably in the vicinity of 30° C. to 90° C.

According to a second alternative form of the preparation of the functionalized diene elastomer according to the invention, the living diene elastomer resulting from the polymerization stage is subjected to the reaction of a functionalization agent and to the reaction of a star-branching agent.

Thus, for example, the functionalization of the living diene elastomer resulting from the polymerization stage can be carried out at a temperature varying from 30° C. to 120° C., in the presence, to begin with, of an appropriate amount of a star-branching agent in order to star-branch preferably from 5% to 45% by weight of the living elastomer. Then, subsequently, the remaining living chains of the diene elastomer obtained after the first stage are all functionalized by addition of an appropriate amount of a tin functionalization agent capable of introducing a tin functional group at the chain end or in the middle of the chain. The functionalization reaction of the diene elastomer is subsequently stopped by the deactivation of the remaining living chains.

The well-informed reader would understand that, during the stages of preparation of the functionalized diene elastomers a) and b), appropriate processing conditions have to be deployed in order to limit the formation of the non-tin-functionalized diene elastomer c).

A further subject-matter of the invention is a reinforced rubber composition based on at least one reinforcing filler and on an elastomer matrix comprising at least one functionalized diene elastomer according to the invention.

The composition can comprise from 1 to 100 phr of functionalized diene elastomer according to invention.

The composition according to the invention can also comprise at least one diene elastomer other than the said functionalized diene elastomer according to the invention. This or these diene elastomers other than the functionalized diene elastomer according to the invention can be chosen from the diene elastomers conventionally used in tires, such as natural rubber or a synthetic elastomer, or also another functionalized or star-branched elastomer.

Use may be made of any type of reinforcing filler known for its abilities to reinforce a rubber composition which can be used for the manufacture of tires, for example a reinforcing organic filler, such as carbon black, a reinforcing inorganic filler, such as silica, or a blend of these two types of filler, in particular a blend of carbon black and silica.

All carbon blacks, in particular blacks of the HAF, ISAF or SAF type, conventionally used in tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks.

Use may also be made, according to the applications targeted, of blacks of higher series FF, FEF, GPF or SRF, for example the N660, N683 or N772 blacks. The carbon blacks might, for example, be already incorporated in the isoprene elastomer in the form of a masterbatch (see, for example, Applications WO 97/36724 or WO 99/16600).

Mention may be made, as examples of organic fillers other than carbon blacks, of functionalized polyvinylaromatic organic fillers, such as described in Applications WO-A-2006/069792 and WO-A-2006/069793.

The term "reinforcing inorganic filler" should be understood, in the present patent application, by definition, as meaning any inorganic or mineral filler, whatever its colour and its origin (natural or synthetic), also known as "white filler", "clear filler" or indeed even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, the term "reinforcing inorganic filler" is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 m²/g, preferably from 30 to 400 m²/g. Mention will be made, as highly dispersible precipitated silicas ("HDSs"), for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber or the silicas with a high specific surface as described in Application WO 03/16837.

When the composition according to the invention is intended for tire treads having a low rolling resistance, the reinforcing inorganic filler used, in particular if it is silica, preferably has a BET specific surface of between 45 and 400 m²/g, more preferably of between 60 and 300 m²/g.

Preferably, the content of reinforcing filler in the composition is between 30 and 150 phr, more preferably between 50 and 120 phr. The optimum is different according to the specific applications targeted: the expected level of reinforcement with regard to a bicycle tire, for example, is, of course, lower than that required with regard to a tire capable of running at high speed in a sustained manner, for example a motorcycle tire, a tire for a passenger vehicle or a tire for a utility vehicle, such as a heavy-duty vehicle.

According to one embodiment, the reinforcing filler predominantly comprises silica, the content of carbon black present in the composition preferably being between 2 and 20 phr.

According to another embodiment of the invention, the reinforcing filler predominantly comprises carbon black.

Use is made, in a known way, in order to couple the reinforcing inorganic filler to the diene elastomer, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "unsymmetrical" according to their specific structure, such as described, for example, in Applications WO 03/002648 (or US 2005/016651) and WO 03/002649 (or US 2005/016650).

Suitable in particular, without the definition below being limiting, are silane polysulphides known as "symetrical", corresponding to the following general formula (III):

$$Z-A-S_x-A-Z, \qquad (III)$$

in which:
x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);
Z corresponds to one of the formulae below:

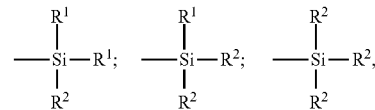

in which:
the $R^1$ radicals, which are substituted or unsubstituted and identical to or different from one another, represent a $C_1$-$C_{18}$ alkyl group, a $C_5$-$C_{18}$ cycloalkyl group or a $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);
the $R^2$ radicals, which are substituted or unsubstituted and identical to or different from one another, represent a $C_1$-$C_{18}$ alkoxy group or a $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of alkoxysilane polysulphides corresponding to the above formula (III), in particular the standard commercially available mixtures, the mean value of the "x" symbols is a fractional number preferably between 2 and 5, more preferably close to 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Use is in particular made, among these compounds, of bis(3-triethoxysilylpropyl)tetrasulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, such as described in the Patent Application WO 02/083782 (or US 2004/132880).

Mention will in particular be made, as coupling agent other than an alkoxysilane polysulphide, of bifunctional POSs (polyorganosiloxanes) or else of hydroxysilane polysulphides ($R^2$=OH in the above formula III), such as described in Patent Applications WO 02/30939 (or U.S. Pat. No. 6,774,255) and WO 02/31041 (or US 2004/051210), or else of silanes or POSs carrying azodicarbonyl functional groups, such as described, for example, in Patent Applications WO 2006/125532, WO 2006/125533, WO 2006/125534 and WO 2009/062733.

In the rubber composition, the content of coupling agent is preferably between 0.5 and 12 phr, more preferably between 3 and 8 phr.

Typically, the content of coupling agent represents from 0.5% to 15% by weight, with respect to the amount of inorganic filler.

A person skilled in the art will understand that a reinforcing filler of another nature, in particular organic nature, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer.

The composition according to the invention can also comprise a chemical crosslinking agent.

The chemical crosslinking makes possible the formation of covalent bonds between the elastomer chains. The chemical crosslinking can be carried out using a vulcanization system or else using peroxide compounds.

The vulcanization system proper is based on sulphur (or on a sulphur-donating agent) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), incorporated during the first non-productive phase and/or during the productive phase, as described subsequently.

The sulphur is used at a preferred content of between 0.5 and 12 phr, in particular between 1 and 10 phr. The primary vulcanization accelerator is used at a preferred content of between 0.5 and 10 phr, more preferably of between 0.5 and 5.0 phr.

Use may be made, as (primary or secondary) accelerator, of any compound capable of acting as accelerator for the vulcanization of diene elastomers in the presence of sulphur, in particular accelerators of the thiazole type, and also their derivatives, and accelerators of thiuram and zinc dithiocarbamate types. These accelerators are, for example, chosen from the group consisting of 2-mercaptobenzothiazyl disulphide (abbreviated to "MBTS"), tetrabenzylthiuram disulphide ("TBZTD"), N-cyclohexyl-2-benzothiazolesulphenamide ("CBS"), N,N-dicyclohexyl-2-benzothiazolesulphenamide ("DCBS"), N-(tert-butyl)-2-benzothiazolesulphenamide ("TBBS"), N-(tert-butyl)-2-benzothiazolesulphenimide ("TBSI"), zinc dibenzyldithiocarbamate ("ZBEC") and the mixtures of these compounds.

Preferably, use is made of a primary accelerator of the sulphenamide type.

When the chemical crosslinking is carried out using one or more peroxide compounds, the said peroxide compound or compounds represent from 0.01 to 10 phr.

Mention may be made, as peroxide compounds which can be used as chemical crosslinking system, of acyl peroxides, for example benzoyl peroxide or p-chlorobenzoyl peroxide, ketone peroxides, for example methyl ethyl ketone peroxide, peroxyesters, for example t-butyl peroxyacetate, t-butyl peroxybenzoate and t-butyl peroxyphthalate, alkyl peroxides, for example dicumyl peroxide, di(t-butyl)peroxybenzoate and 1,3-bis(t-butylperoxyisopropyl)benzene, or hydroperoxides, for example t-butyl hydroperoxide.

The rubber composition according to the invention can also comprise all or a portion of the usual additives generally used in elastomer compositions intended for the manufacture of tires, in particular of treads, such as, for example, plasticizers or extending oils, whether the latter are of aromatic or non-aromatic nature, pigments, protection agents, such as antiozone waxes (such as Cire Ozone C32 ST), chemical antiozonants or antioxidants (such as 6-PPD), antifatigue agents, reinforcing resins, methylene acceptors (for example, phenolic novolak resin) or methylene donors (for example, HMT or H3M), as described, for example, in Application WO 02/10269, or adhesion promoters (cobalt salts, for example).

Preferably, the composition according to the invention comprises, as preferred non-aromatic or very weakly aromatic plasticizing agent, at least one compound chosen from the group consisting of naphthenic oils, paraffinic oils, MES oils, TDAE oils, glycerol esters (in particular trioleates), plasticizing hydrocarbon resins exhibiting a high Tg preferably of greater than 30° C., and mixtures of such compounds.

The composition according to the invention can also comprise, in addition to the coupling agents, activators of the coupling of the reinforcing inorganic filler or more generally processing aids capable, in a known way, by virtue of an improvement in the dispersion of the inorganic filler in the rubber matrix and of a lowering in the viscosity of the compositions, of improving their ease of processing in the raw state, these processing aids being, for example, hydrolysable silanes, such as alkylalkoxysilanes (in particular alkyltriethoxysilanes), polyols, polyethers (for example, polyethylene glycols), primary, secondary or tertiary amines (for example, trialkanolamines), hydroxylated or hydrolysable POSs, for example α,ω-dihydroxypolyorganosiloxanes (in particular α,ω-dihydroxypolydimethylsiloxanes), or fatty acids, such as, for example, stearic acid.

The rubber composition according to the invention is manufactured in appropriate mixers, using two successive phases of preparation according to a general procedure well known to those skilled in the art: a first phase of thermo-mechanical working or kneading (sometimes referred to as "non-productive" phase) at high temperature, up to a maximum temperature of between 130° C. and 200° C., preferably between 145° C. and 185° C., followed by a second phase of mechanical working (sometimes referred to as "productive" phase) at lower temperature, typically below 120° C., for example between 60° C. and 100° C., during which finishing phase the chemical crosslinking system is incorporated.

According to a preferred embodiment of the invention, all the base constituents of the composition included in the tire of the invention, with the exception of the chemical crosslinking agent, namely in particular the reinforcing filler or fillers and the coupling agent, if appropriate, are intimately incorporated, by kneading, in the functionalized diene elastomer and in the other diene elastomers, if appropriate, during the first "non-productive" phase, that is to say that at least these various base constituents are introduced into the mixer and are thermomechanically kneaded, in one or more stages, until the maximum temperature of between 130° C. and 200° C., preferably of between 145° C. and 185° C., is reached.

By way of example, the first (non-productive) phase is carried out in a single thermomechanical stage during which all the necessary constituents, the optional supplementary processing aids and various other additives, with the exception of the chemical crosslinking agent, are introduced into an appropriate mixer, such as an ordinary internal mixer. The total duration of the kneading, in this non-productive phase, is preferably between 1 and 15 min. After cooling the mixture thus obtained during the first non-productive phase, the chemical crosslinking agent is then incorporated at low temperature, generally in an external mixer, such as an open mill; everything is then mixed (productive phase) for a few minutes, for example between 2 and 15 min.

The final composition thus obtained is subsequently calendered, for example in the form of a sheet or plaque, in particular for laboratory characterization, or else extruded in the form of a rubber profiled element which can be used, for example, as a tire tread for a passenger vehicle.

A further subject-matter of the invention is a semi-finished article made of rubber for a tire, comprising the crosslinked or crosslinkable rubber composition according to the invention. Preferably, the said article is a tread.

A final subject-matter of the invention is a tire comprising a semi-finished article according to the invention.

The invention claimed is:

1. An elastomer composed:
   a) of a functionalized diene elastomer, at the chain end or in the middle of the chain, by a tin functional group, exhibiting a monomodal distribution of molecular weights before functionalization and a polydispersity index before functionalization of less than or equal to 1.3,
   b) of a star-branched diene elastomer being branched with a tin-comprising compound, exhibiting a monomodal distribution of molecular weights before star-branching and a polydispersity index before star-branching of less than or equal to 1.3, and
   c) of a content of less than 15% by weight, with respect to the total weight of the elastomer, of a non-tin-functional diene elastomer,
   wherein the diene elastomer a) before functionalization, the diene elastomer b) before star-branching, and the diene elastomer c) being the same in nature.

2. An elastomer according to claim 1, wherein the functionalized diene elastomer a) comprises an amine functional group at one or all of the ends of chains not functionalized by tin.

3. An elastomer according to claim 1, wherein the star-branched diene elastomer b) comprises an amine functional group at the ends of chains not star-branched by tin.

4. An elastomer according to claim 1, wherein the non-tin-functional diene elastomer c) comprises an amine functional group at one of the chain ends.

5. An elastomer according to claim 1, wherein the functionalization of the functionalized diene elastomer a) is obtained with a monohalotin functionalization agent or a dihalotin coupling agent.

6. An elastomer according to claim 1, wherein the star-branching of the stand-branched elastomer b) is obtained with a tri- or tetrahalotin star-branching agent.

7. An elastomer according to claim 1, wherein the functionalized diene elastomer a) is a diene elastomer functionalized by a tin functional group in the middle of the chain and the star-branched diene elastomer b) is a diene elastomer star-branched by tin having 4 branches.

8. An elastomer according to claim 1, wherein the diene elastomers a), b), and c) are chosen from polybutadienes, butadiene-styrene copolymers, butadiene-isoprene copolymers, isoprene-styrene copolymers, butadiene-styrene-isoprene terpolymers and synthetic polyisoprene.

9. An elastomer according to claim 1, comprising from 5% to 45% by weight, with respect to the total weight of the elastomer, of the star-branched diene elastomer b).

10. An elastomer according to claim 9, comprising from 10% to 30% by weight, with respect to the total weight of the elastomer, of the star-branched diene elastomer b).

11. An elastomer according to claim 1, comprising a content of greater than 0% by weight and of less than 10% by weight, with respect to the total weight of the elastomer, of the non-tin-functional diene elastomer c).

12. An elastomer according to claim 11, comprising a content of less than 5% be weight, with respect to the total weight of the elastomer, of the non-tin-functional diene elastomer c).

13. A reinforced rubber composition based on at least one reinforcing filler and on an elastomer matrix, wherein the elastomer matrix comprises at least one elastomer as defined in claim 1.

14. A reinforced rubber composition according to claim 13, wherein the elastomer matrix also comprises at least one diene elastomer other than the elastomer.

15. A reinforced rubber composition according to claim 13, wherein the reinforced rubber composition further comprises a chemical crosslinking agent.

16. A semi-finished article made of rubber for a tire, wherein the rubber comprises a crosslinkable or crosslinked rubber composition as defined in claim 13.

17. A semi-finished article according to claim 16, wherein the article is a tread.

18. A tire, wherein the tire comprises a semi-finished article as defined in claim 16.

* * * * *